United States Patent [19]
Wolff et al.

[11] 4,397,180
[45] Aug. 9, 1983

[54] VALVE POSITION SENSOR FOR A POPPET FUEL INJECTOR VALVE

[76] Inventors: George D. Wolff, P.O. Drawer 9407; Michael S. Ziemacki, 200 Avenue K, SE., Apt. 381, both of Winter Haven, Fla. 33880

[21] Appl. No.: 241,682

[22] Filed: Mar. 9, 1981

Related U.S. Application Data

[63] Continuation-in-part of Ser. No. 87,983, Oct. 25, 1979, Pat. No. 4,359,895, and Ser. No. 187,171, Sep. 15, 1980.

[51] Int. Cl.³ ............................................ G01M 15/00
[52] U.S. Cl. ................................ 73/119 A; 73/DIG. 3
[58] Field of Search ....................... 73/119 A, DIG. 3; 123/261, 287, 297, 305, 617; 340/370.31

[56] References Cited
U.S. PATENT DOCUMENTS 3,259,403  7/1966  Hjalsten et al. ..................... 285/134
3,412,602  11/1968  Rush et al. ..................... 73/DIG. 3

FOREIGN PATENT DOCUMENTS 522651  4/1955  Italy ................................. 73/119 A Primary Examiner—Jerry W. Myracle
Attorney, Agent, or Firm—Duckworth, Allen, Dryer & Pettis

[57] ABSTRACT

A poppet fuel injector valve includes a poppet valve which is positioned within a chamber in the injector and displaceable between open and closed positions. A passageway extends from an exterior surface of the injector into close proximity to the cavity in which the poppet valve is located. A valve position sensor is dimensioned to fit within the passageway and is displaceable into close proximity to the poppet valve. The valve position sensor generates an electrical output signal which corresponds to mechanical displacements of the poppet valve.

37 Claims, 7 Drawing Figures

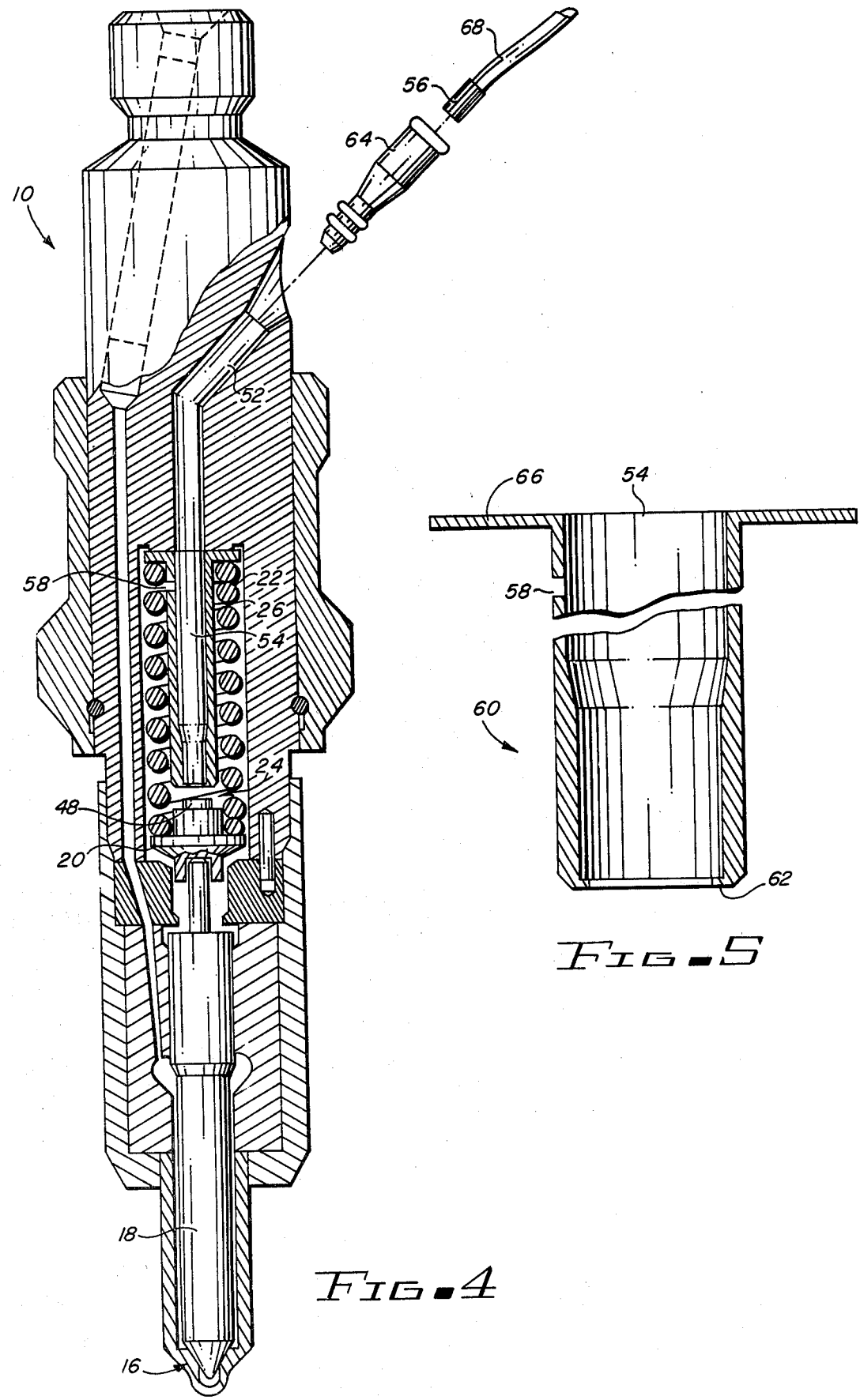

VALVE POSITION SENSOR FOR A POPPET FUEL INJECTOR VALVE

This patent application is a continuation-in-part of U.S. patent application Ser. No. 087,983, filed on Oct. 25, 1979 now U.S. Pat. No. 4,359,895 and of U.S. patent application Ser. No. 187,171 filed on Sept. 15, 1980.

BACKGROUND OF THE INVENTION

1. Field of the Invention

The present invention relates to valve position indicators for fuel injector valves, and more particularly, to a valve position sensor which generates an electrical signal which corresponds to the movement of a poppet valve within a fuel injector.

2. Description of the Prior Art

A needle valve within a fuel injector nozzle holder is opened and closed at appropriately timed intervals to inject desired amounts of fuel into a cylinder of an internal combustion engine such as a diesel engine. It is essential to know when the needle valve opens in relation to the engine crank shaft position in order to designate the appropriate engine timing.

The needle valve comprises a needle and a needle seat. When the needle contacts the needle seat, the valve is closed. When the needle is lifted off the needle seat, the valve opens and fuel is metered through spray orifices into the interior of the engine cylinder. The initial relative vertical displacement between the needle and the needle seat determines the beginning of injection as well as the engine timing.

A poppet fuel injector valve is a related type of fuel injection device which includes an outwardly opening poppet valve for metering fuel through a circular orifice into the interior of an engine cylinder. This type of fuel injector valve includes a spring which biases the poppet valve into the closed position.

Engine timing must be set with precision to not only properly operate the engine, but also to control fuel consumption and the production of undesirable emissions. The engine timing must be set precisely for low fuel consumption while simultaneously minimizing undesired engine emissions. Since there is always a trade off between optimizing fuel consumption and minimizing emissions, engine timing must be set at a point which somewhat compromises both fuel consumption and emission reduction. As a result of the extremely stringent government fuel consumption and emission regulations, the engine timing must be optimized to levels substantially in excess of any prior art requirements. Conventionally, engine timing has been determined by reference to visual markings on the engine flywheel. Robert Bosch has recently exhibited a fuel injector nozzle holder equipped with a non-removable built-in inductive sensor for measuring the engine timing. Capacitive and other methods of measuring needle lift have been used experimentally in the laboratory.

The Creative Tool Company of Lyons, Illinois, is presently selling a product designated as a DIESEL TACH-TIME CT4000 instrument. This product utilizes a split-nut transducer which is installed on an engine cylinder fuel line at either the fuel injection pump or at the nozzle. The mechanical strains produced by the transit of a fuel pressure pulse through the fuel line create mechanical displacements of the fuel line and cause mechanical displacements of the split-nut transducer. When this transducer is deformed, an electrical impulse is sent to the tachometer-timing light unit. This device thereby provides a method of dynamically determining fuel injection pump timing.

SUMMARY OF THE INVENTION

The present invention contemplates a poppet fuel injector valve capable of receiving a valve position sensor. The fuel injector valve includes a poppet valve positioned within a chamber in the injector and displaceable between open and closed positions. A passageway extends from an exterior surface of the injector into close proximity to the poppet valve. The passageway is dimensioned to receive the valve position sensor. The valve position sensor may either be inserted occasionally for the purposes of adjusting the engine timing or may be maintained in place on a permanent basis in order to provide the required beginning of injection timing signal for a closed loop fuel injection system. The valve position sensor is dimensioned to fit within the passageway in the fuel injector and can be displaced into close proximity to the poppet valve. The valve position sensor generates an electrical output signal which corresponds to the mechanical displacements of the poppet valve within the fuel injector.

DESCRIPTION OF THE DRAWINGS

This invention is pointed out with particularity in the appended claims. However, other objects and advantages together with the operation of the invention may be better understood by reference to the following detailed description taken in conjunction with the following illustrations wherein:

FIG. 4 is a sectional view of a fuel injector nozzle holder capable of receiving a needle position sensor.

FIG. 5 is a sectional view of one embodiment of the sensor holder which is positionable within the nozzle holder illustrated in FIG. 4.

DETAILED DESCRIPTION OF THE INVENTION

In order to better illustrate the advantages of the invention and its contributions to the art, the various mechanical and electrical features of a first preferred embodiment of a non-removable version of the invention will now be described in detail.

Figure 1:
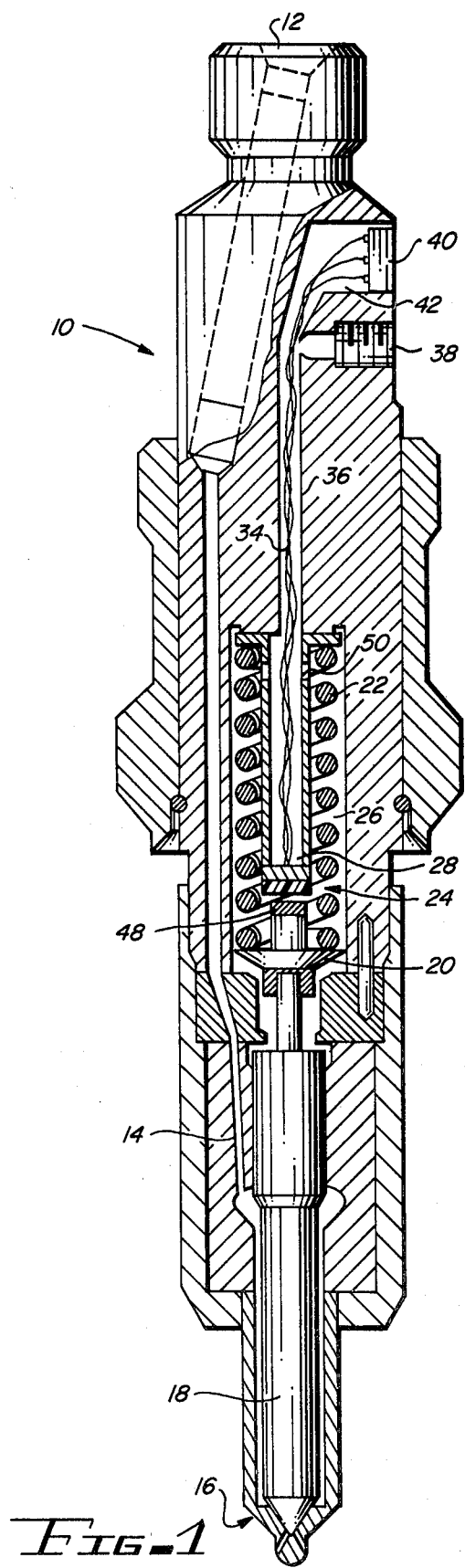
FIG. 1 is a partially cut away sectional view of a fuel injector nozzle holder including a needle position indicator according to the present invention.
Figure 2:
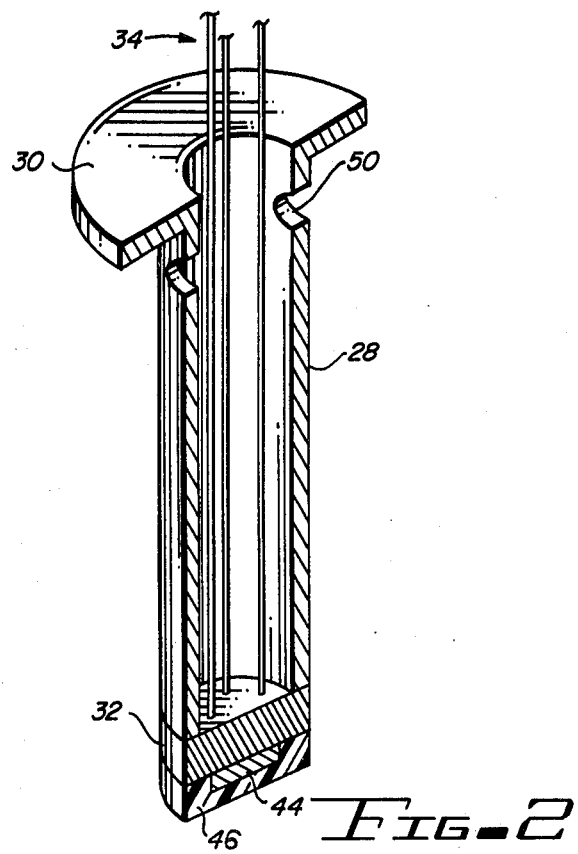
FIG. 2 is a partially cut away perspective view particularly illustrating the Hall effect sensor and mounting bracket of the present invention.

Referring to FIGS. 1 and 2, a commonly used fuel injector nozzle holder 10 is illustrated. Nozzle holder 10 is of a conventional design and is commercially available from fuel injection equipment manufacturers such as Robert Bosch. A high pressure fuel line is coupled to inlet port 12 of nozzle holder 10. Pressurized fuel is transferred from inlet port 12 through passageway 14 into the lower section of nozzle holder 10 in which a needle valve is positioned. The needle valve includes a seat generally indicated by reference number 16 and a needle 18. A spring seat 20 is held by the spring against the upper section of needle 18 and forms an upper extension of needle 18. Spring seat 20 moves in synchronization with needle 18.

A cylindrical spring 22 includes a central spring cavity or passageway 24. Spring 22 is positioned within a cylindrical cavity 26 in nozzle holder 10. In the commercially manufactured version of fuel injector nozzle holder 10, the upper end of spring 22 contacts the upper end of cavity 26 while the lower end of spring 22 contacts spring seat 20. In this manner spring 22 exerts a biasing force against the upper end of needle 18 to bias the lower end of needle 18 against needle seat 16 to maintain the needle valve in the closed position. Fuel pressure at an appropriate level within passageway 14 exerts a force on needle 18 and displaces the entire needle assembly including needle 18 and spring seat 20 upward. Upward displacements of needle 18 are generally on the order of 0.4 to 0.7 millimeters.

In the preferred embodiment of the first invention, a cylindrical mounting bracket 28 includes a body which descends downward through the central spring cavity 24 of spring 22. In the embodiment illustrated the body of mounting bracket 28 is approximately 25 millimeters long and has a diameter of 4.3 millimeters. Mounting bracket 28 also includes a flange 30 on the upper surface. Flange 30 is positioned between the upper surface of cavity 26 and the upper end of spring 22. The upper biasing force exerted by spring 22 against the flange 30 which contact the upper surface of cavity 26 serves to maintain mounting bracket 28 in a fixed position within the spring cavity 24 of spring 22.

A commercially available three lead header 32 is coupled to the lower portion of the body of mounting bracket 28. Header 32 is a commercially available TO-46 device which has been modified by removing the flange which surrounds the commercially available version. Two of the leads of header 32 pass through insulators in the header and penetrate the lower surface of the device. The third lead is a ground lead which is coupled directly to the metallic body of the header. Header 32, utilized in the preferred embodiment of the first invention, is manufactured by Airpax Electronics Company of Cambridge, Maryland. The three electrical leads 34 extending upward from header 32 are fabricated from number thirty Teflon coated wire. Electrical leads 34 are routed upward through the body of mounting bracket 28 and pass through passageway 36 which forms a fuel leakage path by connecting the interior of cavity 26 through the hole(s) 50 in mounting bracket 28 to fuel discharge port 38. To permit electrical leads 34 to extend further upward and to be coupled to receptacle 40, a passageway extension 42 is machined into the body of nozzle holder 10.

A Hall effect sensor 44 is coupled to the lower surface of header 32. Sensor 44 is manufactured on a single 0.066 inch by 0.068 inch integrated circuit chip by Sprague Electric Company of Concord, New Hampshire, and is designated by Model No. UGN-350. This commercially available Hall effect sensor includes a voltage regulator, a Hall effect cell and an amplifier. A layer of epoxy encapsulation 46 surrounds the lower exposed surface of sensor 44. The interior body of mounting bracket 28 is typically filled with a potting compound, such as epoxy material, to mechanically secure electrical leads 34.

A samarium cobalt permanent magnet 48 is adhesively secured to the top surface of spring seat 20. Magnet 48 is approximately two millimeters thick and is fabricated in a size which permits it to be positioned on the upper cylindrical surface of spring holder 20 without extending beyond the perimeter of this device. Magnet 48 is small, but produces a magnetic flux density of about 1200 Gauss. The upper surface of magnet 48 is separated from the lower surface of epoxy encapsulation 46 by a spacing of about one millimeter when the needle valve is in the resting or unactuated position. When needle 18 is displaced upward by about 0.4 to 0.7 millimeters as the needle valve is opened, the magnetic flux density in the vicinity of Hall effect sensor 44 is substantially changed, causing the output voltage of this device to change linearly in proportion to the displacement of needle 18. This change in output voltage is transmitted by leads 34 to receptacle 40. A monitoring device may be coupled to receptacle 40 and indicates both the upward and the downward displacements of needle 18 which corresponds to either an increase or a decrease of the magnetic flux density within cavity 26.

Figure 3:
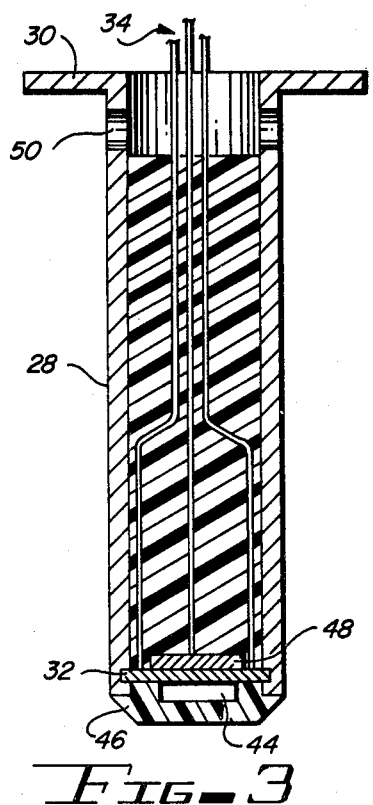
FIG. 3 is a sectional view of a second embodiment of the Hall effect sensor and its mounting bracket.

Referring now to FIG. 3, a modified version of the preferred embodiment of the present invention is disclosed. In this embodiment, permanent magnet 48 is coupled to the upper surface of header 32. Upward and downward displacements of spring holder 20 change the magnetic flux density in the vicinity of Hall effect sensor 44 since spring holder 20 is fabricated from a ferromagnetic material. These changes in the flux density cause changes in the output state of sensor 44 in the same manner as that described above in connection with the embodiment illustrated in FIGS. 1 and 2.

FIG. 3 best illustrates that one or more vent holes 50 are positioned in the upper portion of mounting bracket 28. Vent holes 50 permit the free flow of discharge fuel from cavity 26 into fuel discharge passageway 36.

An oscilloscope may be coupled directly to receptacle 40 to monitor the output waveform generated by Hall effect sensor 44. In this manner the timing of the needle valve opening and closing, the duration of injection, or continuous needle position can be monitored. In certain instances it may be desirable to couple a differentiator to receptacle 40 and couple an oscilloscope to the output of the differentiator. The differentiator produces a sharp readily discernable voltage spike when the needle valve either opens or closes.

The needle position indicator of the invention may be included in each of the fuel injectors of an engine or may be included in only a single nozzle holder since engine timing can be set by reference to the opening time of only a single needle valve. Alternatively, the needle position indicator of the invention may be included in a nozzle holder which is maintained at a maintenance station. Whenever it is necessary to set engine timing, a mechanic can remove the conventional nozzle holder from the engine and insert a nozzle holder including the needle position indicator of the invention. The engine timing can thus be readily set and monitored by electronic monitoring devices used by the mechanic. Use of the needle position indicator permits engine timing to be set while the engine is running and in addition enables engine timing to be on a continuous basis.

The needle position indicator of the invention may also be coupled to provide a feedback signal for use in a closed loop electronically controlled timing system for a fuel injection system. In another embodiment, the needle position indicator of the invention can be used to monitor wear of fuel injection system components by measuring engine timing changes, particularly at low speed. When the engine timing has changed a predetermined amount as indicated by relative timing of the opening of the needle valve, maintenance personnel can replace the appropriate fuel injection system element to prevent untimely mechanical failure.

It would be apparent to those skilled in the art that the disclosed needle position indicator for a fuel injector nozzle holder may be modified in numerous ways and may assume many embodiments other than the preferred forms specifically set out and described above. For example, the invention can be incorporated in many different configurations of nozzle holders manufactured by many different organizations for use in passenger cars, tractors, trucks, ships, or any other type of diesel engine.

Referring now to FIGS. 4 and 5, a second embodiment of the needle position sensing system will now be described. This embodiment permits a needle position sensing device to be inserted into or removed from cylindrical cavity 26 without having to remove nozzle holder 10 from the engine and without having to disassemble nozzle holder 10.

In the nozzle holder embodiment illustrated in FIG. 4, a sensor passageway 52 is provided. The lower portion of sensor passageway 52 is aligned with the hollow interior of sensor holding means 54. The upper portion of sensor passageway 52 is inclined at an angle to the vertical, causing passageway 52 to intersect the exterior surface of nozzle holder 10 at a desired location. Generally, the diameter of both the upper and lower sections of passageway 52 and the diameter of the upper section of sensor holding means 54 will be slightly larger than the diameter of an externally insertable sensing means 56.

An aperture 58 is provided in the upper portion of sensor holding means 54 to permit unpressurized fuel which has leaked into cylindrical cavity 26 to be discharged into the interior of sensor holding means 54. The fuel passing through aperture 58 travels upward though sensor holding means 54 into the lower section of sensor passageway 52. It will be generally desirable to provide a separate fuel leakoff passageway which may be oriented in a place perpendicular to the plane defined by the upper and lower sections of sensor passageway 52. This separate fuel leak-off passageway is not specifically illustrated in FIG. 4, but would extend between sensor passageway 52 and an exterior surface of nozzle holder 10. Leak-off fuel would then be coupled via a fuel discharge line back to the engine fuel tank.

The lower section of sensor holding means 54 includes a reduced diameter section indicated generally by reference number 60. The diameter of section 60 is approximately equal to the maximum dimension of needle position sensing means 56. The lower end of sensor holding means 54 includes means for preventing vertical translation of needle position sensor 54 below a predetermined point. In the embodiment illustrated in FIGS. 4 and 5, vertical translation preventing means takes the form of a second reduced diameter section indicated generally by reference number 62 and includes a diameter less than the maximum diameter of needle position sensor 56.

The upper portion of sensor passageway 52 is flared outward and is designed to receive a plug or cap 64. Plug 64 includes a cylindrical lower section which is inserted into the sensor passageway 52 to prevent discharge of any leak-off fuel from this aperture in nozzle holder 10. Plug 64 may be manufactured from various different types of material such as rubber, plastic or cork and may assume many different configurations other than the specific configuration illustrated in FIG. 4. It may also be desirable to provide some type of locking means or threads for securely attaching plug 64 to sensor passageway 52. Adaptations or modifications of this type would be well known by those skilled in the art.

As is illustrated in FIG. 4, the outer dimension of sensor holding means 54 is less than the inner diameter of spring 22. A flange 66 is formed by the upper end of sensor holding means 54 and serves to maintain the sensor holder in a fixed position within cavity 26.

In the embodiment illustrated, a magnet 48 of the same type specified for the FIG. 1 embodiment is coupled to the upper surface of spring seat 20 to generate a magnetic field within the interior of cylindrical chamber 26. As was discussed above, it is apparent that magnet 48 could be located at other positions within chamber 26 or alternatively could be coupled within sensing means 56 as is generally suggested by the configuration of the invention illustrated in FIG. 3. In other embodiments, spring seat 20, spring 22 or even other elements of the sensor holder might also be magnetized to provide the necessary magnetic flux density within the interior of cavity 26.

In this embodiment of the invention illustrated in FIG. 4 including magnet 48, a Hall effect sensor would be provided for sensing means 56. This Hall effect device can be fabricated in the manner in connection with the FIGS. 1–3 embodiment discussed above. The Sprague Electric Company Hall effect sensor described above is also usable in this embodiment of the invention.

Many other different types of needle position sensing means could be substituted for the Hall effect sensor. For example, an eddy current proximity measuring device of a type generally similar to the proximity measuring system sold by Kaman Measurement Systems of Colorado Springs, Colorado could be utilized. An eddy current position sensing device uses an inductive operating principle to measure the distance between a coil (the sensing device) and a metallic object such as the moving needle spring seat system. The proximity of the sensor to the target material controls the operating amplitude of an oscillator. These amplitude variations are detected and electronically conditioned to provide an analog signal proportional to the displacement of the moving metallic object. The Kaman model KD-2400 proximity measuring system provides sensors of various dimensions. In the eddy current sensor version of the present invention, the sensor must be designed such that it would be displaced through passageway 52 and inserted into sensor holder 56 as described above.

Inductive, capacitative or various other different kinds of sensing means could readily be adapted to be used with the nozzle holder system illustrated in FIGS. 4 and 5.

A multi-conductor electrical cable 68 is coupled to sensing means 56 and serves a two-fold purpose. First, cable 68 provides electrical communication between an indicator unit (such as an oscilloscope) and sensing means 56. Second, cable 68 serves as a tether for sensing means 56 and permits the removal and insertion of sensing means 56 into the desired fixed position in the lower portion of sensor holding means 54. Cable 68 must be sufficiently flexible to flex around the corner formed between the upper and lower elements of sensor passageway 52. On the other hand, cable 68 must be sufficiently stiff to permit the user to externally apply a force which will cause sensing means 56 to be displaced into the appropriate position in the lower portion of sensor holding means 54. As a result of the mechanical vibrations imparted by the engine to nozzle holder 10, it may be desirable for the operator to maintain a downward pressure or biasing force on cable 68 to maintain sensing means 56 firmly in position in the lower portion of sensor holding means 54.

One of the primary advantages of the needle position sensing system described immediately above is a dramatic cost saving in comparison to the non-removable needle position sensor illustrated in FIGS. 1–3. With the removable needle position sensing system, the comparatively expensive sensor must only be inserted at the specific time when it is desired to adjust engine timing or to otherwise measure or control engine performance. Therefore, a single comparatively expensive sensor can at any time be inserted into or removed from a nozzle holder of the type illustrated in FIG. 4.

If, on the other hand, sensor 56 forms a part of a closed loop fuel injection system and therefore must be continuously present within nozzle holder 10, the removable feature of the present invention permits a defective sensor to readily be removed and replaced. It is thus not necessary to remove and replace the entire nozzle holder assembly and thereby break the seal in the high pressure fuel injection system, nor is it necessary to discard an entire nozzle holder merely because the sensor has failed. In a closed loop fuel injection system of this type, cable 68 would be routed directly through the center of plug 64 so that plug 64 can be maintained in position in nozzle holder 10 while cable 68 and sensor 56 are in position within nozzle holder 10.

It will be apparent to those skilled in the art that the disclosed removable needle position sensor system described above may be modified in numerous ways and may assume many embodiments other than the preferred forms specifically set out and described above. For example, needle position sensors not yet invented at the present time may be readily adaptable for use in the present invention or other presently available but excessively large position sensing devices may be miniaturized in the future to a point where they can be inserted into the specially adapted nozzle holder described above.

Figure 6:
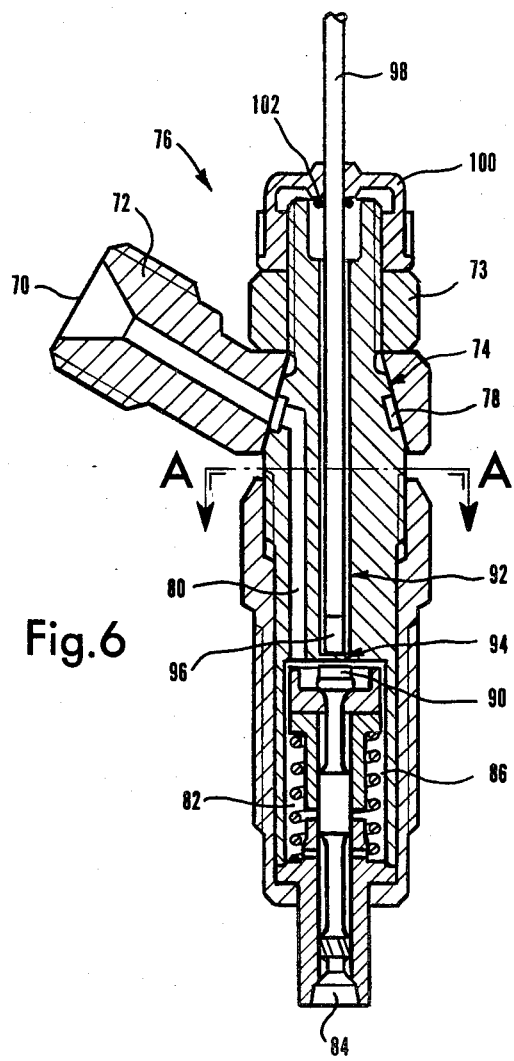
FIG. 6 is a sectional view of a poppet fuel injector valve which has been modified to incorporate the structure of the present invention.
Figure 7:
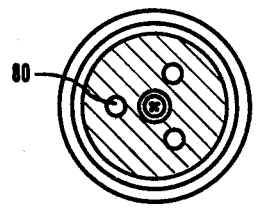
FIG. 7 is a sectional view of the poppet fuel injector valve illustrated in FIG. 6, taken along section line A—A.

Referring now to FIGS. 6 and 7 of the present invention, a third embodiment is disclosed which is compatible with a poppet fuel injector valve. FIG. 6 represents an enlarged scale drawing of a miniaturized poppet fuel injector valve. Lucas C.A.V. Ltd. manufactures a miniaturized poppet fuel injector valve of the type illustrated in FIG. 6 under the trademark MICROJECTOR and this type of miniaturized fuel injector valve has been incorporated in the 350 cubic inch diesel engines utilized by General Motors in their diesel engine passenger vehicles. Certain structural modifications have been incorporated into this poppet valve as will be recited below. Unmodified, commercially available versions of this poppet fuel injector valve have a high pressure fuel line coupled to the upper end of the injector body. A cylindrical passageway permits a flow of pressurized fuel through the upper body of the injector into the chamber within which the poppet valve is incorporated.

The poppet fuel injector valve illustrated in FIG. 6 receives pressurized fuel through a fuel inlet 70. Fuel inlet fitting 72 may be fabricated from steel, such as Armco 17-4PH stainless, and includes a conical section indicated generally by reference number 74. Conical section 74 tightly seals fuel inlet fitting 72 to the body of fuel injector 76. A locking nut 73 maintains fuel inlet fitting 72 in fluid tight contact with the body of fuel injector 76. A circular passageway 78 is cut in the inclined, exterior surface of the body of fuel injector 76 as illustrated in FIG. 6. Passageway 78 communicates with each of three vertically oriented fuel passageways indicated in FIGS. 6 and 7 by reference number 80. The lowermost portion of fuel passageways 80 opens into and communicates with a cavity 82 which houses poppet valve 84. Poppet valve 84 is spring biased in an upward or closed position by spring 86.

A miniature, high power magnet 90, such as a samarium cobalt permanent magnet, is coupled to the upper end surface of poppet valve 84.

A cylindrical passage indicated generally by reference number 92 is drilled vertically downward along the vertical axis of fuel injector 76. The lowermost extension of passageway 92 extends as close as possible to cavity 82. A thin section of metal designated by reference number 94 separates the lowermost extension of passageway 92 from cavity 82. This thin metal section, which in the illustrated embodiment is 0.5 millimeters, also prevents the transfer of high pressure fuel from the interior of cavity 82 into the interior of passageway 92, which is maintained fluid free and at an ambient air pressure.

A valve position sensor 96 is dimensioned to fit within passageway 92 and is coupled to a Teflon wrapped four conductor stranded wire assembly 98. A plastic cap 100 can be removed from fuel injector 76 to permit easy removal and reinsertion of valve position sensor 96 and wire assembly 98 into and out of passageway 92. Valve position sensor 96 carries a retaining ring 102 which is positioned on wire assembly 98 such that cap 100 exerts a downward pressure on sensor 96 via wire 98 when cap 100 is screwed down against nut 73.

While valve position sensor 96 could take the form of one of a different number of types of proximity sensing devices, inductive or Hall effect sensors can readily be incorporated for use in the disclosed embodiment of the invention. A Hall effect sensor of the type discussed above can be manufactured on a single integrated circuit chip having dimensions of 1.5 to 1.5 millimeters or smaller. A dual cell Hall effect integrated circuit chip measuring 1.245 by 1.270 millimeters has been manufactured by the Sprague Electric Company of Concord, Massachusetts. The integrated circuit chip is mounted on a ceramic header having a diameter of 2.2 millimeters. The entire Hall effect sensor assembly is epoxy encapsulated.

When a Hall effect device is incorporated within valve position sensor 96, it is important to fabricate the body of fuel injector 76 from a material which will not become magnetized during fabrication. Nitronic 60 stainless steel has been utilized in the preferred embodiment of the invention since this particular steel alloy has the required anti-magnetic property.

In operation, poppet valve 84 is mechanically displaced between open and closed positions as a result of fuel pressure overcoming the biasing force exerted by biasing spring 86. Since magnet 90 is coupled to the upper end of poppet 84, the up and down displacements of magnet 90 within cavity 82 modify the magnetic flux density which is sensed by valve position sensor 96. These changes in magnetic flux density are converted into varying electrical output signals which are coupled to an externally positioned read-out device such as an oscilloscope by wire assembly 98.

The thin area of non-magnetic stainless steel designated by reference number 94 contains the pressurized fuel within chamber 82, but permits the passage of magnetic flux generated by magnet 90 into the area within passageway 92 which is occupied by valve position sensor 96. Valve position sensor 96 is thus subject only to ambient air pressure and does not have to be specially adapted to function within a high pressure region nor are special sealing techniques required to prevent the leakage of high pressure fuel from the area in which the sensor is located.

It will be apparent to those skilled in the art that the disclosed valve position sensor for a poppet fuel injector valve may be modified in numerous ways and may assume many embodiments other than the preferred forms specifically set out and described above. For example, the present invention can be incorporated in many different configurations of fuel injector valves as long as the existing structure of the valve or an alternative restructured valve design can be implemented which permits a passageway to be bored within the fuel injector from an exterior surface into close proximity to the displaceable portion of the injector valve. Cylindrical passageway 92 could be accessed at a 30° angle as shown in FIG. 4 and the sensor inserted through a 30° passage. In that case the fuel inlet would be centrally located as in FIG. 4. Accordingly, it is intended by the appended claims to cover all such modifications of the invention which fall within the true spirit and scope of the invention.

I claim:

1. A poppet fuel injector valve capable of receiving a magnetically sensitive valve position sensor, said valve and sensor comprising:
   (a) a poppet valve positioned within a chamber in said injector and displaceable between open and closed positions,
   (b) a passageway extending from an exterior surface or said injector into close proximity to the cavity in which said poppet valve is located, said passageway being dimensioned to receive a magnetically sensitive valve position sensor;
   (c) a magnetically sensitive valve position sensor slideable into and out of said passageway;
   (d) a magnet on the extremity of said valve adjacent said passageway; and wherein
   (e) said passageway extends sufficiently adjacent said chamber such that the positioning of said magnetically sensitive sensor at the extremity of said passageway permits said sensor to detect magnetic flux changes of said magnet, as said magnet moves with said valve between said open and closed positions.

2. The fuel injector valve of claim 1 wherein said poppet valve includes an upper end and wherein said passageway extends into close proximity to the upper end of said poppet valve.

3. The fuel injector valve of claim 1 wherein said passageway extends through the body of said injector valve.

4. The fuel injector valve of claim 1 wherein said passageway is a cylindrical passageway.

5. The fuel injector valve of claim 4 wherein said injector valve includes a vertical axis and wherein said cylindrical passageway extends vertically downward through said injector valve and is centered about the vertical axis.

6. The fuel injector valve of claim 5 wherein said passageway extends within 0.2 to 2.0 millimeters of said chamber.

7. The fuel injector valve of claim 1 wherein said injector valve includes a vertical axis and wherein said passageway is inclined at an angle from 0° to 40° with respect to said vertical axis.

8. The fuel injector valve of claim 7 wherein said injector valve includes a fuel inlet located on or about the center of said injector.

9. The fuel injector valve of claim 1 further including a fuel inlet fitting coupled to said injector valve.

10. The fuel injector valve of claim 9 wherein said fuel inlet fitting includes a ring which surrounds the exterior surface of said fuel injector.

11. The fuel injector valve of claim 10 wherein said passageway passes through the ring of said fuel inlet fitting.

12. A poppet fuel injector valve comprising:
   (a) a poppet valve positioned within a chamber in said injector and displaceable between open and closed positions;
   (b) a passageway extending from an exterior surface of said injector into close proximity, on the order of between 0.2 to 210 millimeters, to said poppet valve in said chamber; and
   (c) a valve position sensor dimensioned to fit within said passageway for generating an electrical output signal corresponding to mechanical displacements of said poppet valve as said poppet valve opens and closes.

13. The fuel injector valve of claim 12 wherein said poppet valve includes an upper end and wherein said passageway extends into close proximity to the upper end of said poppet valve.

14. The fuel injector valve of claim 13 wherein said passageway extends through the body of said injector valve.

15. The fuel injector valve of claim 13 wherein said passageway is a cylindrical passageway.

16. The fuel injector valve of claim 15 wherein said injector valve includes a vertical axis and wherein said cylindrical passageway extends vertically downward through the body of said injector valve and is centered about the vertical axis.

17. The fuel injector valve of claim 12 further including means for generating a magnetic field within said chamber.

18. The fuel injector valve of claim 17 wherein said magnetic field generating means is coupled to said poppet valve.

19. The fuel injector valve of claim 18 wherein said magnetic field generating means comprises a magnet.

20. The fuel injector valve of claim 19 wherein said poppet valve includes an upper end and wherein said magnet is coupled to the upper end of said poppet valve.

21. The fuel injector valve of claim 12 wherein said valve position sensor comprises an inductive sensor.

22. The fuel injector valve of claim 12 wherein said valve position sensor comprises a Hall effect sensor.

23. The fuel injector valve of claim 22 wherein said Hall effect sensor is fabricated on a single integrated circuit chip.

24. The fuel injector valve of claim 22 wherein said Hall effect sensor includes a pair of Hall cells.

25. The fuel injector valve of claim 22 wherein said Hall effect sensor includes four Hall cells.

26. The fuel injector valve of claim 22 wherein said Hall effect sensor generates an electrical output pulse which corresponds to the initial opening of said poppet valve and to the beginning of injection of fuel.

27. A poppet fuel injector valve comprising:
   (a) a poppet valve positioned within a chamber in said injector and displaceable between open and closed positions;
   (b) a passageway extending from an exterior surface of said injector into close proximity to said poppet valve; and
   (c) a valve position sensor dimensioned to slide into and out of said passageway and displaceable into close proximity to said poppet valve for generating an electrical output signal corresponding to mechanical displacements of said poppet valve.

28. The fuel injector valve of claim 27 wherein said valve position sensor comprises a Hall effect sensor.

29. The fuel injector valve of claim 28 further including means for generating a magnetic field within said chamber.

30. The fuel injector valve of claim 29 wherein said magnetic field generating means is coupled to said poppet valve.

31. The fuel injector valve of claim 30 wherein said magnetic field generating means comprises a magnet.

32. The fuel injector valve of claim 31 wherein said poppet valve includes an upper end and wherein said magnet is coupled to the upper end of said poppet valve.

33. The fuel injector valve of claim 32 wherein said passageway is a cylindrical passageway.

34. The fuel injector valve of claim 33 wherein said passageway extends to within 0.2 to 2.0 millimeters of said chamber.

35. The fuel injector valve of claim 34 wherein said injector valve includes a vertical axis and wherein said cylindrical passageway extends vertically downward through the body of said injector valve and is centered about the vertical axis.

36. The fuel injector valve of claim 32 wherein said Hall effect sensor is fabricated on a single integrated circuit chip.

37. A poppet fuel injector valve, comprising:
   (a) a valve body having a fuel passageway therein for receiving pressurized fuel;
   (b) a poppet valve extending through said body for opening and closing said fuel passageway;
   (c) a sensor passageway extending through said valve body and axial with said valve;
   (d) a magnetically sensitive sensor dimensioned for sliding into and out of said sensor passageway; and
   (e) a magnet at the extremity of said valve adjacent the extremity of said sensor passageway.

* * * * *